United States Patent
Borlick et al.

(10) Patent No.: US 10,257,023 B2
(45) Date of Patent: Apr. 9, 2019

(54) DUAL SERVER BASED STORAGE CONTROLLERS WITH DISTRIBUTED STORAGE OF EACH SERVER DATA IN DIFFERENT CLOUDS

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 15/130,469

(22) Filed: Apr. 15, 2016

(65) Prior Publication Data

US 2017/0302507 A1 Oct. 19, 2017

(51) Int. Cl.
*H04L 12/24* (2006.01)
*H04L 29/08* (2006.01)
*H04L 29/14* (2006.01)

(52) U.S. Cl.
CPC .......... *H04L 41/0668* (2013.01); *H04L 67/10* (2013.01); *H04L 67/1097* (2013.01); *H04L 69/40* (2013.01)

(58) Field of Classification Search
CPC .................... H04L 41/0668; H04L 67/1097
See application file for complete search history.

(56) References Cited

U.S. PATENT DOCUMENTS

| | | | | |
|---|---|---|---|---|
| 7,065,038 B1* | 6/2006 | Brandt | ...................... | H04L 1/08 370/219 |
| 7,409,706 B1* | 8/2008 | O'Rourke | ........... | H04L 63/0218 718/105 |
| 7,685,459 B1* | 3/2010 | De Spiegeleer | .... | G06F 11/1453 714/6.12 |
| 7,702,906 B1* | 4/2010 | Karr | ........................ | H04L 67/10 713/164 |
| 8,650,299 B1* | 2/2014 | Huang | .................. | G06F 9/5077 709/226 |
| 9,489,254 B1* | 11/2016 | Franklin | .............. | G06F 11/1004 |
| 2009/0144344 A1* | 6/2009 | McBride | ........... | G06F 17/30575 |
| 2010/0228819 A1* | 9/2010 | Wei | .......................... | G06F 9/505 709/203 |
| 2011/0093862 A1* | 4/2011 | Doatmas | ............... | G06F 3/0617 718/105 |

(Continued)

OTHER PUBLICATIONS

A. Westphal, et al., "IBM System Storage DS8000 Architecture and Implementation", IBM Corporation, Document No. SG24-8886-02, Nov. 2012, pp. 534.

(Continued)

*Primary Examiner* — Blake J Rubin
(74) *Attorney, Agent, or Firm* — Rabindranath Dutta; Konrad Raynes Davda & Victor LLP (57) ABSTRACT

A storage controller comprising a first server and a second server is maintained. Data of the first server is stored in a first storage cloud, and data of the second server is stored in a second storage cloud. In response to a failure of the second server, the first server performs operations of the second server by using the stored data of the first server in the first storage cloud.

18 Claims, 10 Drawing Sheets

(56) References Cited

U.S. PATENT DOCUMENTS

| | | | |
|---|---|---|---|
| 2011/0218967 A1* | 9/2011 | Sliger | G06F 12/00 |
| | | | 707/647 |
| 2012/0110346 A1* | 5/2012 | Resch | H04L 67/1097 |
| | | | 713/189 |
| 2015/0215389 A1* | 7/2015 | Spencer | H04L 67/1002 |
| | | | 707/741 |
| 2016/0098331 A1* | 4/2016 | Banka | G06F 11/1471 |
| | | | 714/6.21 |
| 2016/0357439 A1* | 12/2016 | Uehara | G06F 3/0604 |
| 2017/0235758 A1* | 8/2017 | Gopalapura Venkatesh | |
| | | | G06F 8/65 |
| | | | 707/625 |
| 2017/0277451 A1* | 9/2017 | Gole | G06F 11/004 |
| 2018/0077007 A1* | 3/2018 | Olson | H04L 69/40 |

OTHER PUBLICATIONS

U.S. Appl. No. 14/961,166, filed Dec. 7, 2015.
U.S. Appl. No. 14/961,247, filed Dec. 7, 2015.
U.S. Appl. No. 14/961,208, filed Dec. 7, 2015.
U.S. Appl. No. 15/078,185, filed Mar. 23, 2016.
U.S. Appl. No. 15/078,187, filed Mar. 23, 2016.
U.S. Appl. No. 15/130,481, filed Apr. 15, 2016.

* cited by examiner

DUAL SERVER BASED STORAGE CONTROLLERS WITH DISTRIBUTED STORAGE OF EACH SERVER DATA IN DIFFERENT CLOUDS

BACKGROUND

1. Field

Embodiments relate to dual server based storage controllers with distributed storage of each server data in different clouds.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller. Further details of a storage controller may be found in the publication "IBM System Storage DS8000: Architecture and Implementation," Third Edition, published November 2012, by International Business Machines Corporation.

SUMMARY OF THE PREFERRED EMBODIMENTS

Provided are a method, a system, and a computer program product in which a storage controller comprising a first server and a second server is maintained. Data of the first server is stored in a first storage cloud, and data of the second server is stored in a second storage cloud. In response to a failure of the second server, the first server performs operations of the second server by using the stored data of the first server in the first storage cloud.

In additional embodiments, in response to a failure of the first server, the second server performs operations of the first server by using the stored data of the second server in the second storage cloud.

In further embodiments, the first server has affinity to first parts of data, and the second server has affinity to second parts of data. The first storage cloud stores the first parts of data and backup of the second parts of data. The second storage cloud stores the second parts of data and backup of the first parts of data.

In additional embodiments, the first server has affinity to even numbered logical subsystems (LSS), and the second server has affinity to odd numbered LSS. The first storage cloud provides memory for the even numbered LSS to the first server, and provides non-volatile storage (NVS) for the odd numbered LSS to the first server. The second storage cloud provides memory for the odd numbered LSS to the second server, and provides NVS for even numbered LSS to the second server.

In yet additional embodiments, the first storage cloud is comprised of two different clouds that together provides memory for even numbered LSS, and NVS for odd numbered LSS, to the first server. The second storage cloud is comprised of two additional different clouds that together provides memory for the odd numbered LSS, and NVS for the even numbered LSS, to the second server.

In certain embodiments, cache memory for the first server for even numbered LSS is stored in the storage controller. Cache memory for the second server for odd numbered LSS is stored in the storage controller. NVS for the first server for odd numbered LSS is stored in the first storage cloud. NVS for the second server for even numbered LSS is stored in the second storage cloud.

In certain embodiments, the storage controller is coupled to a plurality of hosts. The first server and the second server comprise central electronic complexes enclosed within the storage controller. The first storage cloud and the second storage cloud are managed by different vendors. Each of the first storage cloud and the storage cloud comprises a cloud server coupled to a plurality of storage devices.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a dual server based storage system, in which the servers of the dual server based storage system place different parts of their data in a plurality of cloud storages. The dual server based storage system may aggregate the parts of the data stored in the plurality of cloud storages for performing the function of the storage system, in response to a failure of one of the servers of dual server based storage system.

Exemplary Embodiments

Figure 1:
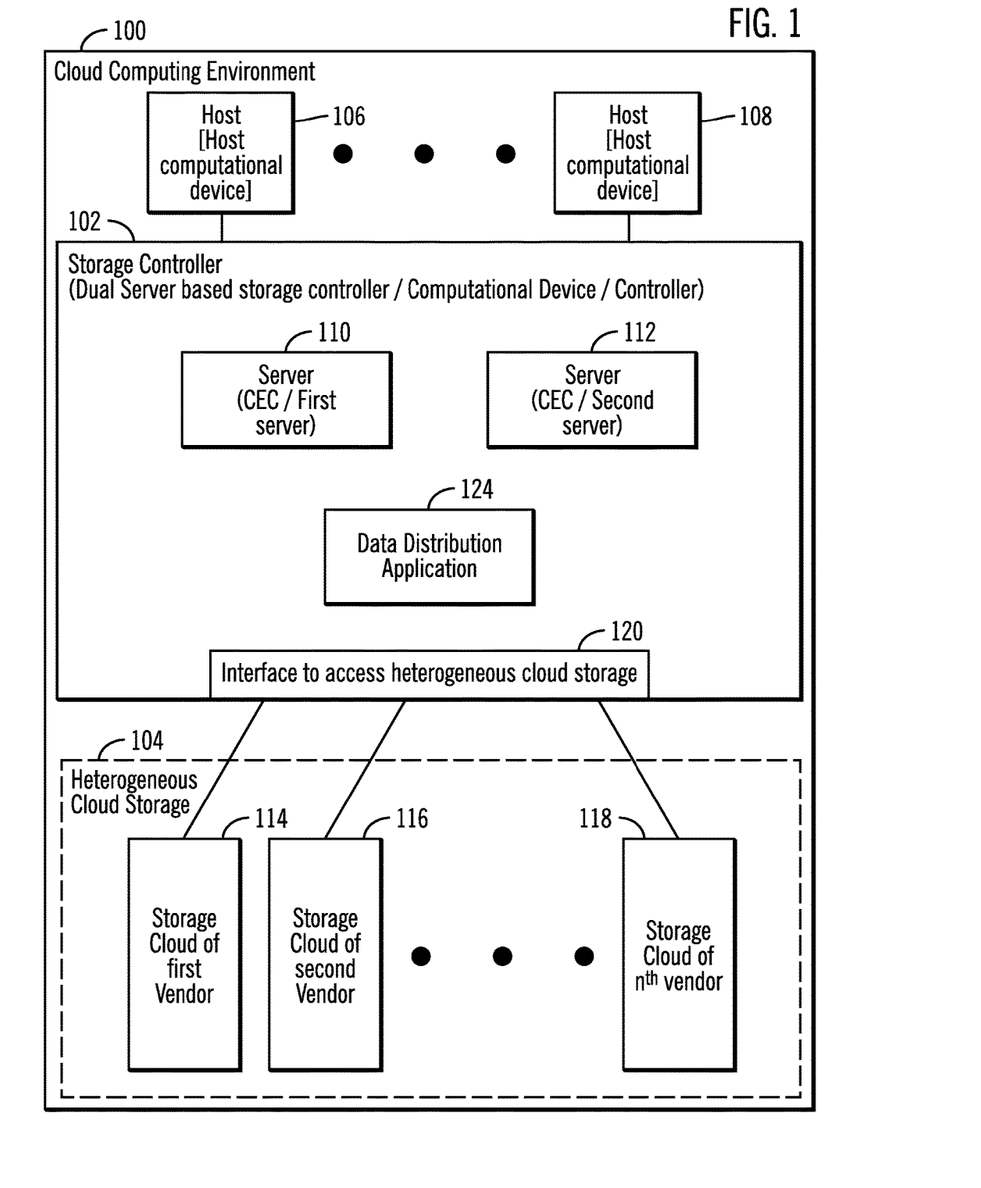
FIG. 1 illustrates a block diagram of a cloud computing environment comprising a dual server based storage controller coupled to a heterogeneous cloud storage comprising storage clouds distributed over a plurality of geographical locations, in accordance with certain embodiments.

FIG. 1 illustrates a block diagram of a cloud computing environment 100 comprising a storage controller 102 coupled to a heterogeneous cloud storage 104 comprising storage clouds distributed over a plurality of geographical locations, in accordance with certain embodiments. The storage controller 102 allows a plurality of hosts 106, 108 (e.g., host computational devices) to perform input/output (I/O) operations with logical storage maintained by the storage controller 102. The physical storage corresponding to the logical storage may be found in at least the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, and other elements. The storage controller 102 may be referred to as a dual server based storage controller because of the presence of the servers 110, 112 in the storage controller 102. The servers 110, 112 of the storage controller 102 and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity, and where each of the plurality of storage clouds may be maintained in different geographical locations. For example, a first vendor may provide the storage cloud 114, a second vendor may provide the storage cloud 116, and a third vendor may provide the storage cloud 118. The different storage clouds 114, 116, 118 may be placed at different geographical locations separated by a considerable distance, such as at least 10 kilometers, or for that matter in different countries or continents.

Each storage cloud 114, 116, 118 may be comprised of a plurality of storage devices, such as storage disks, tape drives, solid state storage, etc., that are maintained by a storage server (referred to as a cloud server) that has an operating system. In certain embodiments, the storage cloud 114 maintained by the first vendor may be in a first geographical location and may have one operating system, whereas the storage cloud 116 maintained by the second vendor may be in a second geographical location and may have another operating system.

The storage controller 102 may have an interface 120 to access the heterogeneous cloud storage 104. Additionally, a data distribution application 124 that distributes and aggregates data of the servers 110, 112 in different storage clouds in the heterogeneous cloud storage 104 may execute in the storage controller 102. The data distribution and application 124 may be implemented in software, firmware, or hardware, or any combination thereof, in accordance with certain embodiments.

In certain embodiments, in response to a failure of the first server 110, the second server 112 takes over the performing of the operations of the first server 110. Furthermore, in response to a failure of the second server 112, the first server 110 takes over the performing of the operations of the second server 112.

The storage controller 102 may provide virtualization capabilities for storage and simplify multiple storage systems into a single machine comprising dual servers. The storage controller 102 allows the hosts 106, 108 to address the storage via logical storage volumes maintained by the storage controller 102 in at least the heterogeneous cloud storage 104. The storage controller 102 tries to maintain two copies of the data while the data is moving through the storage controller 102 and the heterogeneous cloud storage 104. When a write is issued to a logical storage volume and both the first server 110 and the second server 112 are operational, the write data is directed to the server that owns the logical storage volume. A logical storage volume may be a member of an even numbered logical subsystem (even numbered LSS) or an odd numbered logical subsystem (odd numbered LSS), where the storage controller 102 may manage storage in a plurality of logical subsystems (e.g., logical subsystems with identifying numbers ranging from 0 to 255).

In certain embodiments, the LSSs that have an even identifying number have an affinity with the first server 110, and LSSs that have an odd identifying number have an affinity with the second server 112. When a host (e.g., 106, 108) issues a write to a logical volume, the storage controller 102 may direct that write to the server that owns (i.e., has affinity to) the LSS of which that logical volume is a member.

Figure 2:
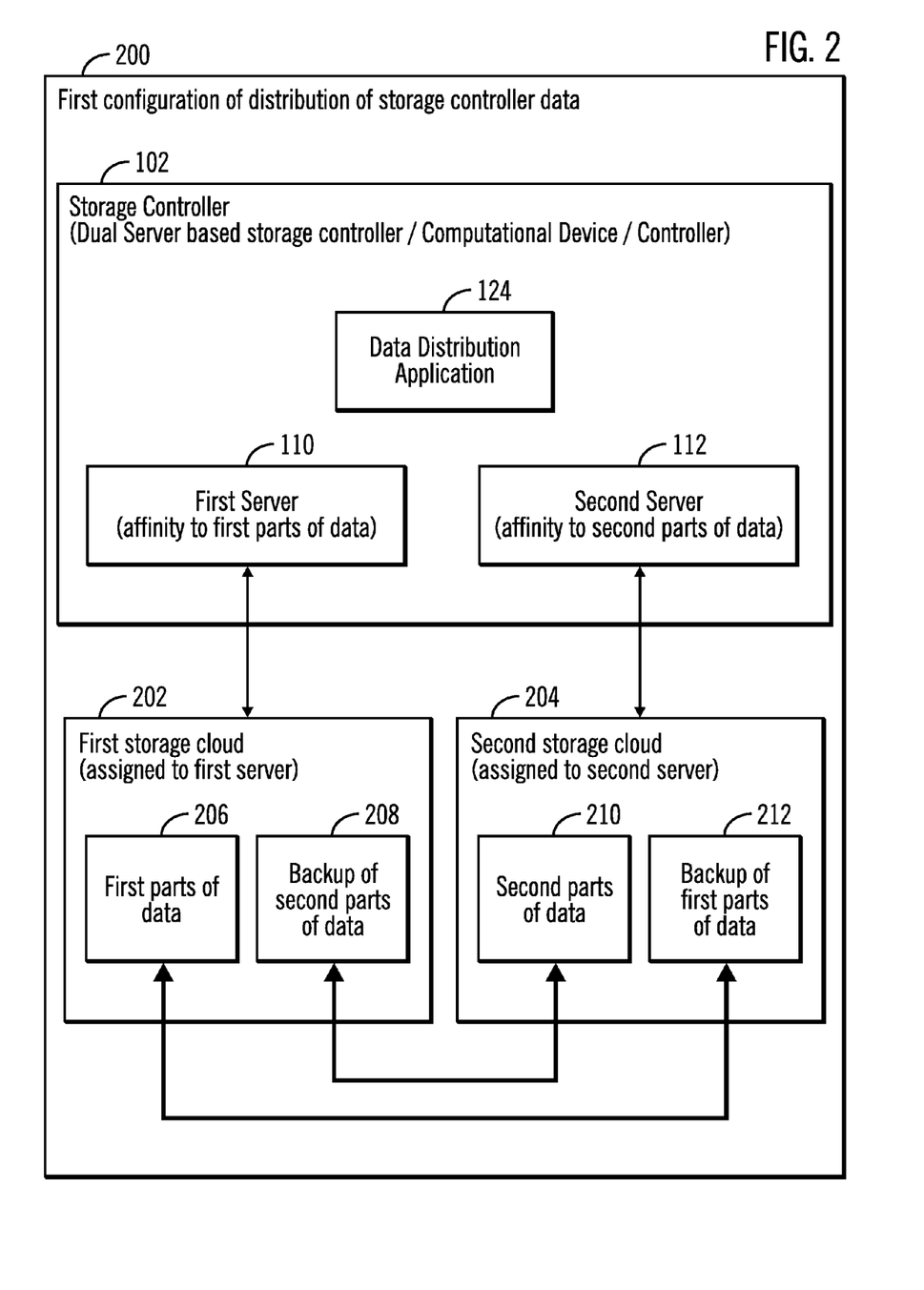
FIG. 2 illustrates a block diagram that shows different parts of data of the dual server based storage controller being stored in different storage clouds, in accordance with certain embodiments.

FIG. 2 shows a block diagram 200 of a first configuration of distribution of storage controller data. The block diagram 200 of FIG. 2 shows different parts of data of the dual server based storage controller 102 being stored in different storage clouds 202, 204, in accordance with certain embodiments.

In FIG. 2, the first server 110 has affinity to first parts of data, and the second server 112 has affinity to second parts of data. The first storage cloud 202 is assigned to the first server 110 and stores the first parts of data 206 and backup of the second parts of data 208. The second storage cloud 204 is assigned to the second server 112 and stores the second parts of data 210 and backup of the first parts of data 212.

Therefore, if the second server 112 is non-operational, then the operational first server 110 is able to perform the operations of the second server by using the backup of the second parts of data 208 stored in the storage cloud 202 assigned to the first server 110.

Furthermore, if the first server 110 is non-operational, then the operational second server 112 is able to perform the operations of the first server 110 by using the backup of the first parts of data 212 stored in the storage cloud 204 assigned to the second server 112.

Figure 3:
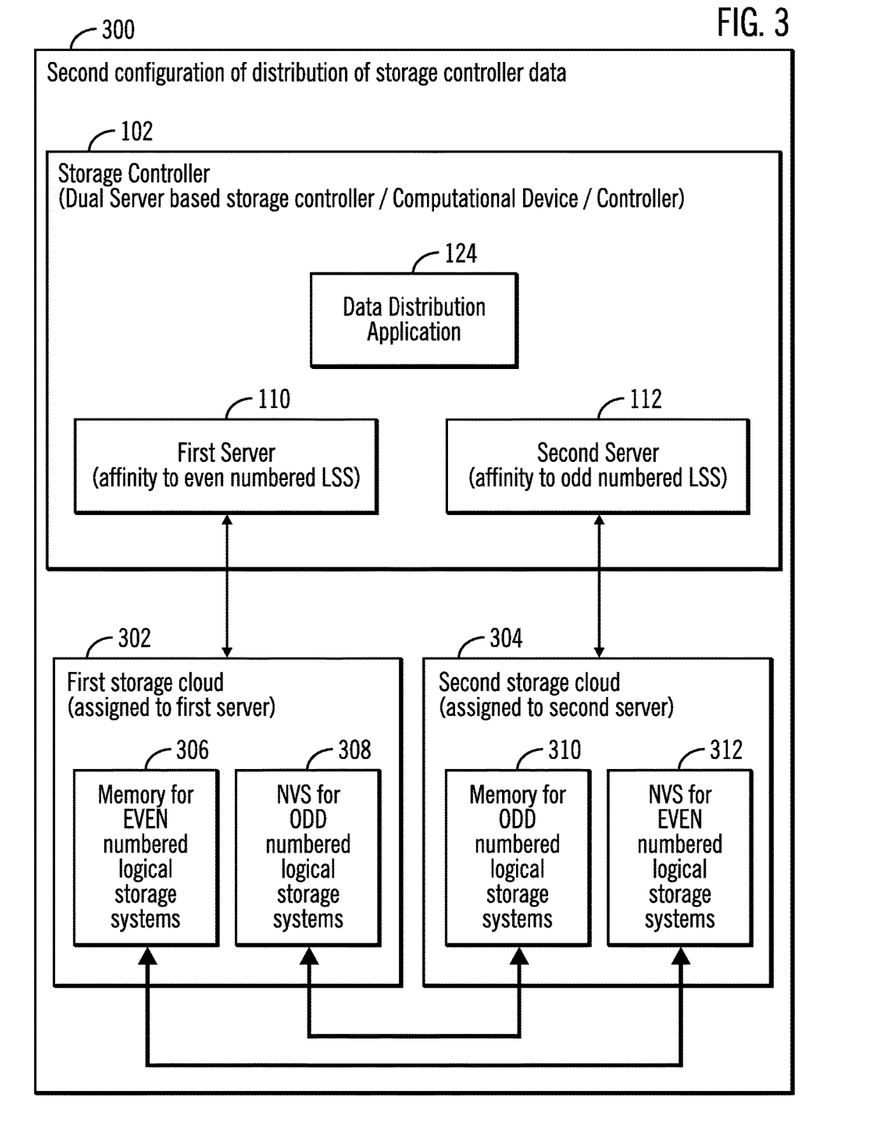
FIG. 3 illustrates a block diagram that shows memory and non-volatile storage of the dual server based storage controller being provided by two storage clouds, in accordance with certain embodiments.

FIG. 3 shows a block diagram 300 of a second configuration of distribution of storage controller data. The block diagram 300 of FIG. 3 shows memory and non-volatile storage of the dual server based storage controller 102 being provided by two storage clouds 302, 304, in accordance with certain embodiments.

The first server 110 has affinity to even numbered logical subsystems (LSS), and the second server 112 has affinity to odd numbered LSS. The first storage cloud 302 assigned to the first server 110 provides memory 306 for the even numbered LSS to the first server 110, and provides non-volatile storage (NVS) 308 for the odd numbered LSS to the first server 110. The second storage cloud 304 provides memory 310 for the odd numbered LSS to the second server 112, and provides NVS 312 for even numbered LSS to the second server 112. The NVS 308 stores backup of data stored in memory 310, and the NVS 312 stores backup of data stored in memory 306.

Therefore, if the second server 112 is non-operational, then the operational first server 110 is able to perform the operations of the second server 112 by using the NVS 308 stored in the first storage cloud 202 assigned to the first server 110. The first server 110 of course keeps using the memory 306 provided by the first storage cloud 302 for operations directed at even numbered LSS, as the first server 110 has affinity to even numbered LSS.

Furthermore, if the first server 110 is non-operational, then the operational second server 112 is able to perform the operations of the first server 110 by using the NVS 312 stored in the second storage cloud 204 assigned to the second server 112. The second server 112 of course keeps using the memory 310 provided by the second storage cloud 304 for operations directed at odd numbered LSS, as the second server 112 has affinity to odd numbered LSS.

Figure 4:
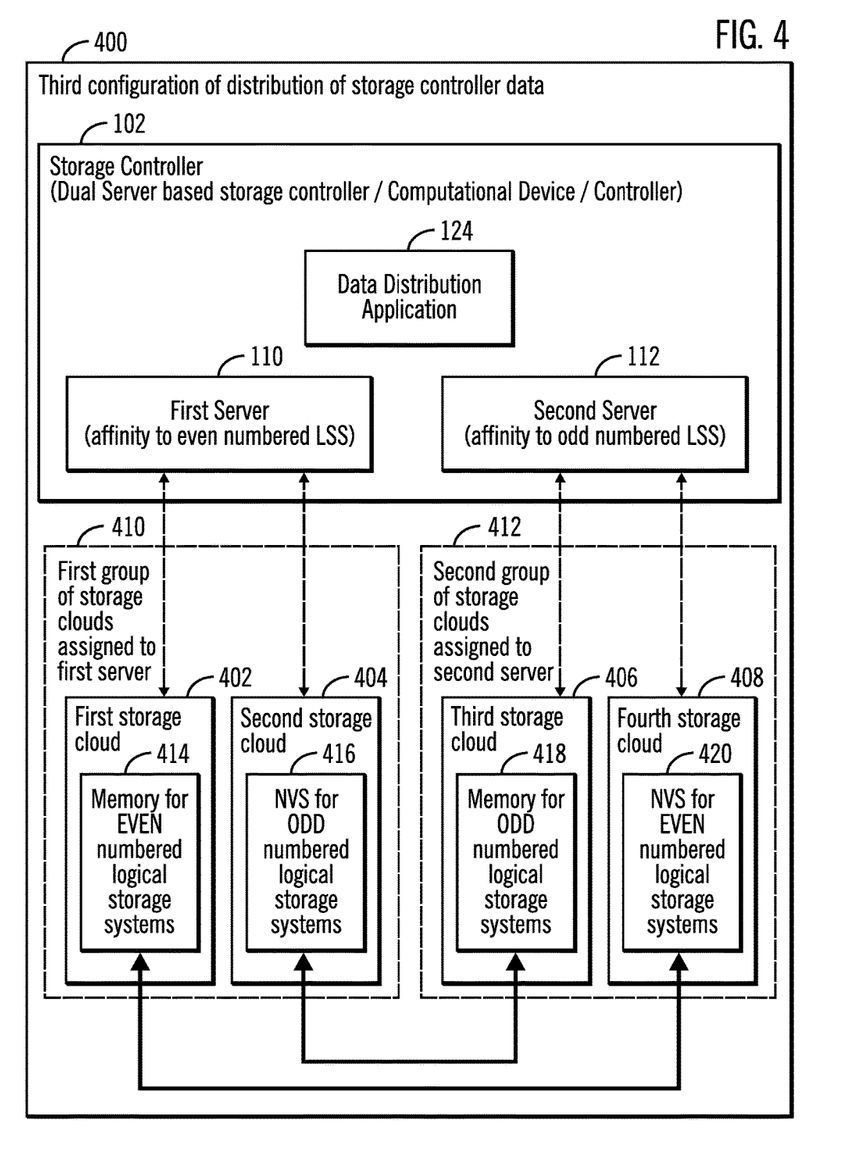
FIG. 4 illustrates a block diagram that shows memory and non-volatile storage of the dual server based storage controller being provided by four storage clouds, in accordance with certain embodiments.

FIG. 4 shows a block diagram 400 of a third configuration of distribution of storage controller data. The block diagram 400 of FIG. 4 shows memory and non-volatile storage of the dual server based storage controller 102 being provided by four storage clouds 402, 404, 406, 408, in accordance with certain embodiments. The first storage cloud 402 and the second storage cloud 404 comprise a first group of storage clouds 410 assigned to the first server 110. The third storage cloud 406 and the fourth storage cloud 408 comprise a second group of storage clouds 412 assigned to the second server 112.

The first server 110 has affinity to even numbered logical subsystems (LSS), and the second server 112 has affinity to odd numbered LSS. The first group of storage clouds 410 is comprised of two different clouds 402, 404 that together provides memory 414 for even numbered LSS, and NVS 416 for odd numbered LSS, to the first server 110. The second group of storage clouds 412 is comprised of two additional different clouds 406, 408 that together provides memory 418 for the odd numbered LSS, and NVS 420 for the even numbered LSS, to the second server 112. The NVS 416 stores backup of data stored in memory 418, and the NVS 420 stores backup of data stored in memory 414.

Therefore, if the second server 112 is non-operational, then the operational first server 110 is able to perform the operations of the second server by using the NVS 416 stored in the second storage cloud 404 assigned to the first server 110. The first server 110 of course keeps using the memory 414 provided by the first storage cloud 402 for operations directed at even numbered LSS, as the first server 110 has affinity to even numbered LSS.

Furthermore, if the first server 110 is non-operational, then the operational second server 112 is able to perform the operations of the first server 110 by using the NVS 420 stored in the fourth storage cloud 408 assigned to the second server 112. The second server 112 of course keeps using the memory 418 provided by the third storage cloud 406 assigned to the second server 112 for operations directed at odd numbered LSS, as the second server 112 has affinity to odd numbered LSS.

Figure 5:
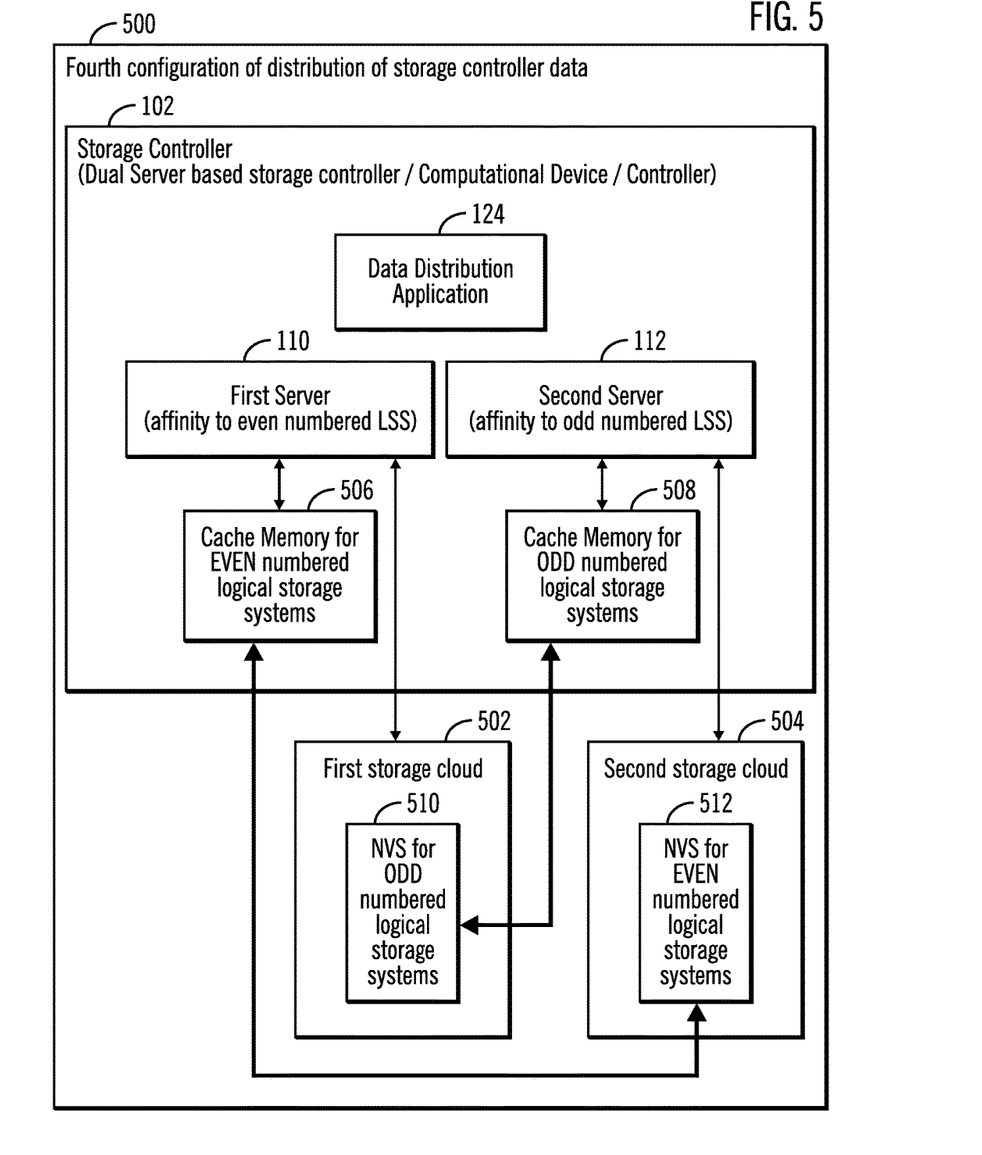
FIG. 5 illustrates a block diagram that shows non-volatile storage of the dual server based storage controller being provided by two storage clouds, in accordance with certain embodiments.

FIG. 5 shows a block diagram 500 of a fourth configuration of distribution of storage controller data. The block diagram 500 of FIG. 5 shows non-volatile storage of the dual server based storage controller 102 being provided by two storage clouds 502, 504, in accordance with certain embodiments.

The first server 110 has affinity to even numbered logical subsystems (LSS), and the second server 112 has affinity to odd numbered LSS. In certain embodiments, cache memory 506 for the first server 110 for even numbered LSS is stored in the storage controller 102. Cache memory 508 for the second server 112 for odd numbered LSS is stored in the storage controller 102. NVS 510 for the first server 110 for odd numbered LSS is stored in the first storage cloud 502. NVS 512 for the second server for even numbered LSS is stored in the second storage cloud 504. The NVS 510 stores backup of data stored in cache memory 508, and the NVS 512 stores backup of data stored in cache memory 506.

Therefore, if the second server 112 is non-operational, then the operational first server 110 is able to perform the operations of the second server by using the NVS 510 stored in the first storage cloud 502 assigned to the first server 110. The first server 110 of course keeps using the cache memory 506 for operations directed at even numbered LSS, as the first server 110 has affinity to even numbered LSS.

Furthermore, if the first server 110 is non-operational, then the operational second server 112 is able to perform the operations of the first server 110 by using the NVS 512 stored in the second storage cloud 504 assigned to the second server 112. The second server 110 of course keeps using the cache memory 508 for operations directed at odd numbered LSS, as the second server 112 has affinity to odd numbered LSS.

Figure 6:
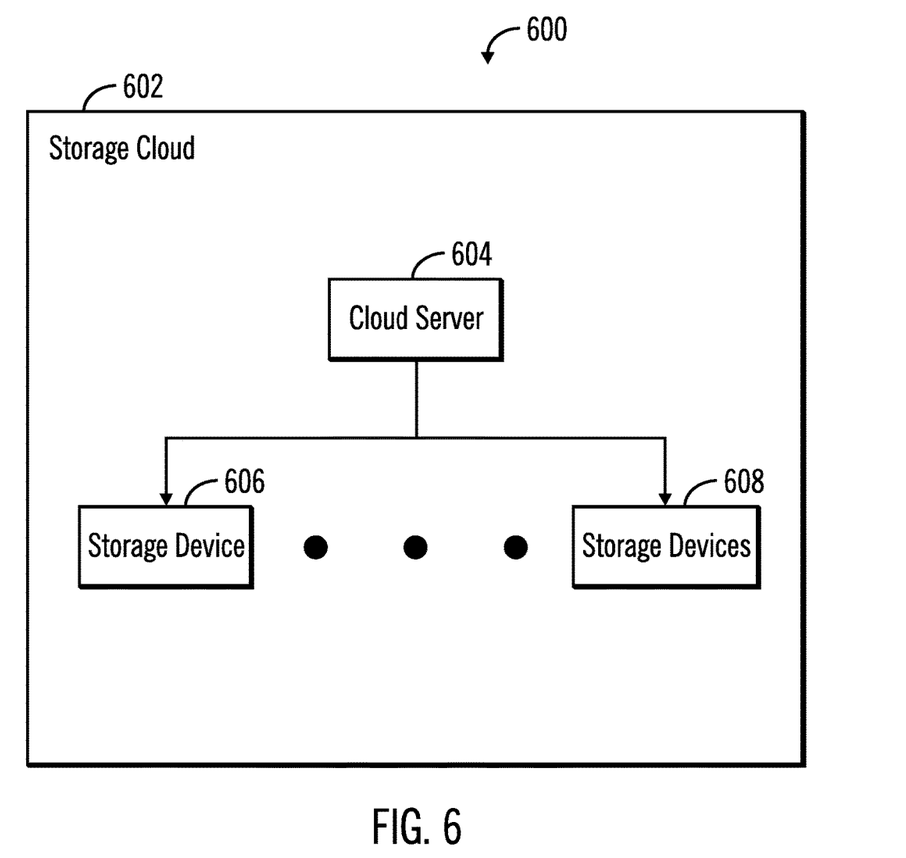
FIG. 6 illustrates a block diagram that shows a storage cloud comprised of a cloud server and a plurality of storage devices coupled to the cloud server, in accordance with certain embodiments.

FIG. 6 illustrates a block diagram 600 that shows a storage cloud 602 comprised of a cloud server 604 and a plurality of storage devices 606, 608 coupled to the cloud server 604, in accordance with certain embodiments. The cloud server 604 may comprise any suitable computational device including those presently known in the art, such as, a personal computer, a workstation, a server, a mainframe, a hand held computer, a palm top computer, a telephony device, a network appliance, a blade computer, a processing device, etc. The storage devices 606, 608 may comprise any suitable storage device comprising a disk drive, a tape drive, an optical drive, a solid state drive, etc. The storage cloud 602 may correspond to any of the storage clouds 114, 116, 118 shown in FIG. 1, or other storage clouds 202, 204, 302, 304, 402, 404, 406, 408, 502, 504 shown in FIGS. 2-5.

Figure 7:
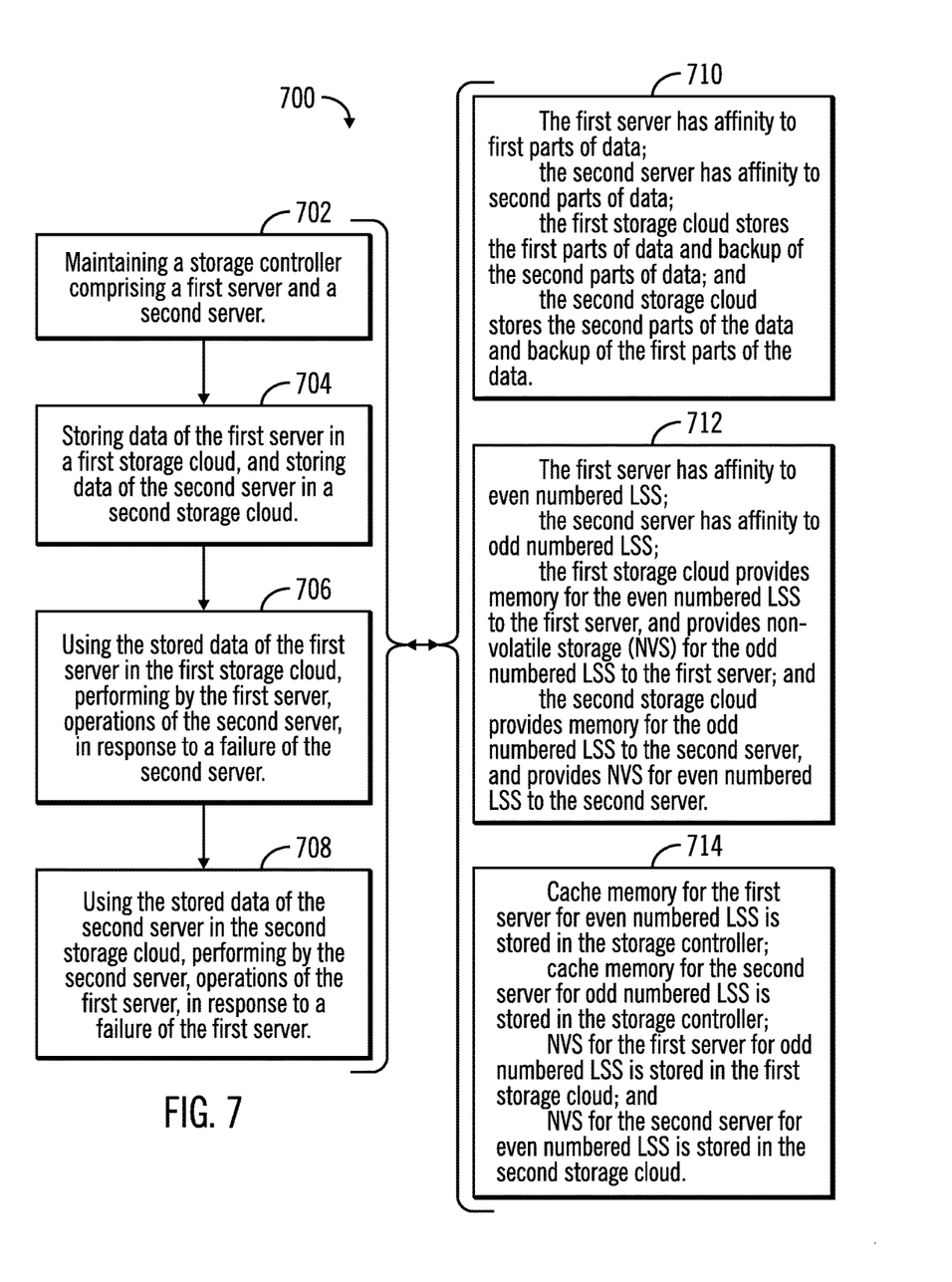
FIG. 7 illustrates a flowchart that shows operations performed in the cloud computing environment comprising the storage controller and a plurality of cloud servers in different configurations, in accordance with certain embodiments.

FIG. 7 illustrates a flowchart 700 that shows operations performed in the cloud computing environment 100 comprising the storage controller 102 and a plurality of cloud servers in different configurations, in accordance with certain embodiments;

Control starts at block 702 in which a storage controller 102 comprising a first server 110 and a second server 112 is maintained. Data of the first server 110 is stored in a first storage cloud, and data of the second server 112 is stored in a second storage cloud (at block 704). In response to a failure of the second server 112, the first server 110 performs (at block 706) operations of the second server 112 by using the stored data of the first server 110 in the first storage cloud.

In response to a failure of the first server 110, the second server 112 performs (at block 708) operations of the first server 110 by using the stored data of the second server 112 in the second storage cloud.

In FIG. 7, reference numeral 710, 712, 714 show various configurations in which the operations shown in blocks 702, 704, 706, 708 are performed.

In embodiments shown via reference numeral 710, the first server 110 has affinity to first parts of data, and the second server 112 has affinity to second parts of data. The first storage cloud stores the first parts of data and backup of the second parts of data. The second storage cloud stores the second parts of data and backup of the first parts of data.

In embodiments shown via reference numeral 712, the first server 110 has affinity to even numbered logical subsystems (LSS), and the second server 112 has affinity to odd numbered LSS. The first storage cloud provides memory for the even numbered LSS to the first server 110, and provides non-volatile storage (NVS) for the odd numbered LSS to the first server 110. The second storage cloud provides memory for the odd numbered LSS to the second server 112, and provides NVS for even numbered LSS to the second server 112.

In embodiments shown via reference numeral 714, cache memory for the first server 110 for even numbered LSS is stored in the storage controller 102. Cache memory for the second server 112 for odd numbered LSS is stored in the storage controller 102. NVS for the first server 110 for odd numbered LSS is stored in the first storage cloud. NVS for the second server 112 for even numbered LSS is stored in the second storage cloud.

Therefore, FIGS. 1-7 illustrate certain embodiments in which a dual server based storage controller distributes data in a plurality of parts in a plurality of clouds and provides mechanisms to recover from a failure of one of the servers of the dual server based storage controller.

Further Cloud Computing Environments

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
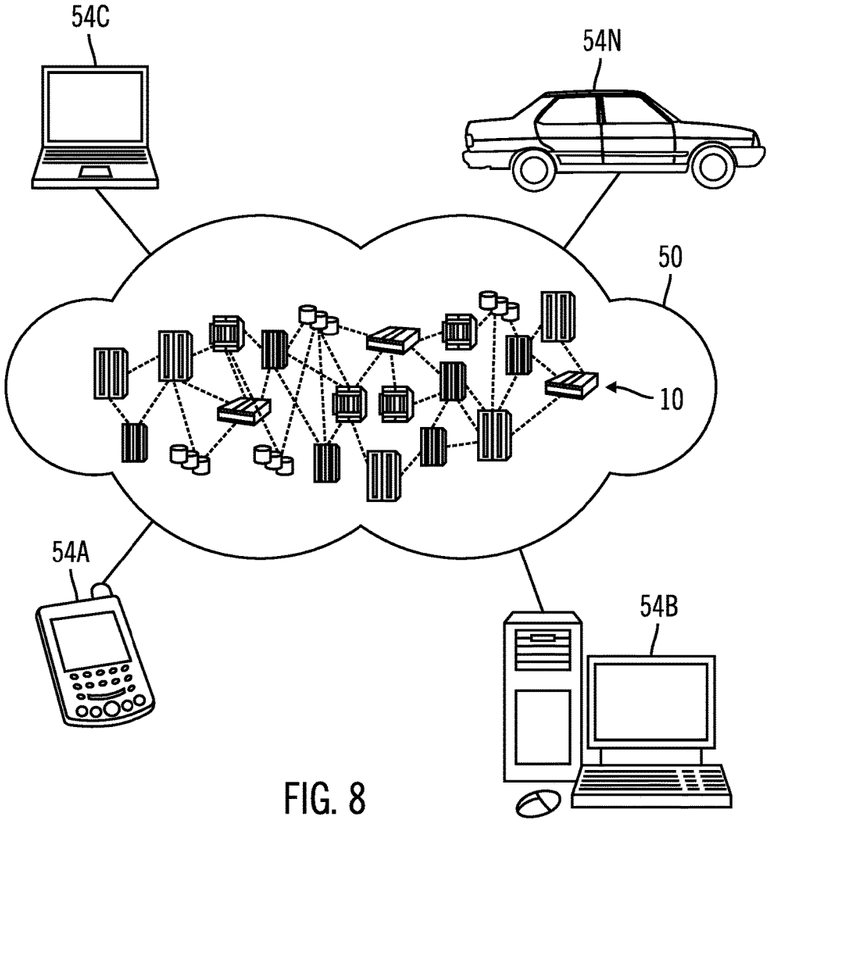
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 9:
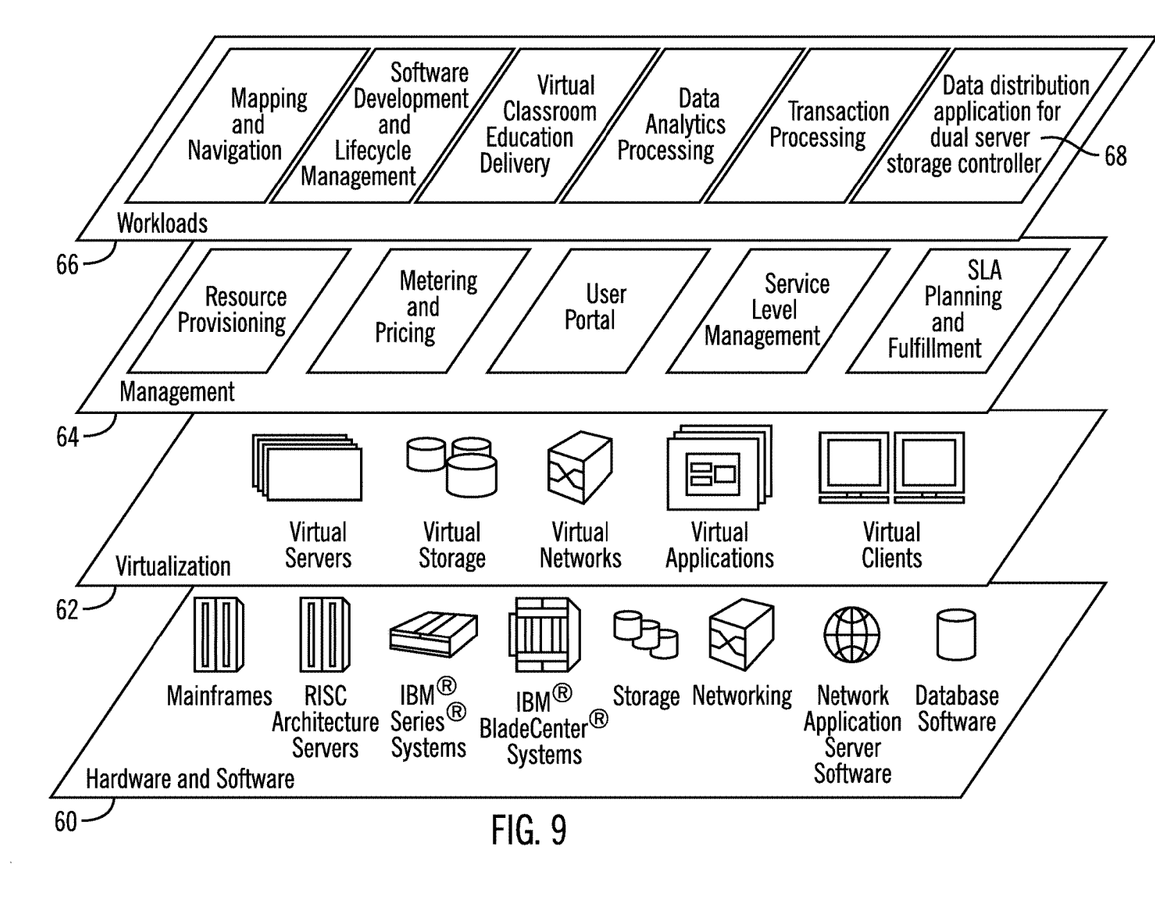
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the data distribution application 124 for the dual server storage controller 102 (shown via reference numeral 68 in FIG. 9) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
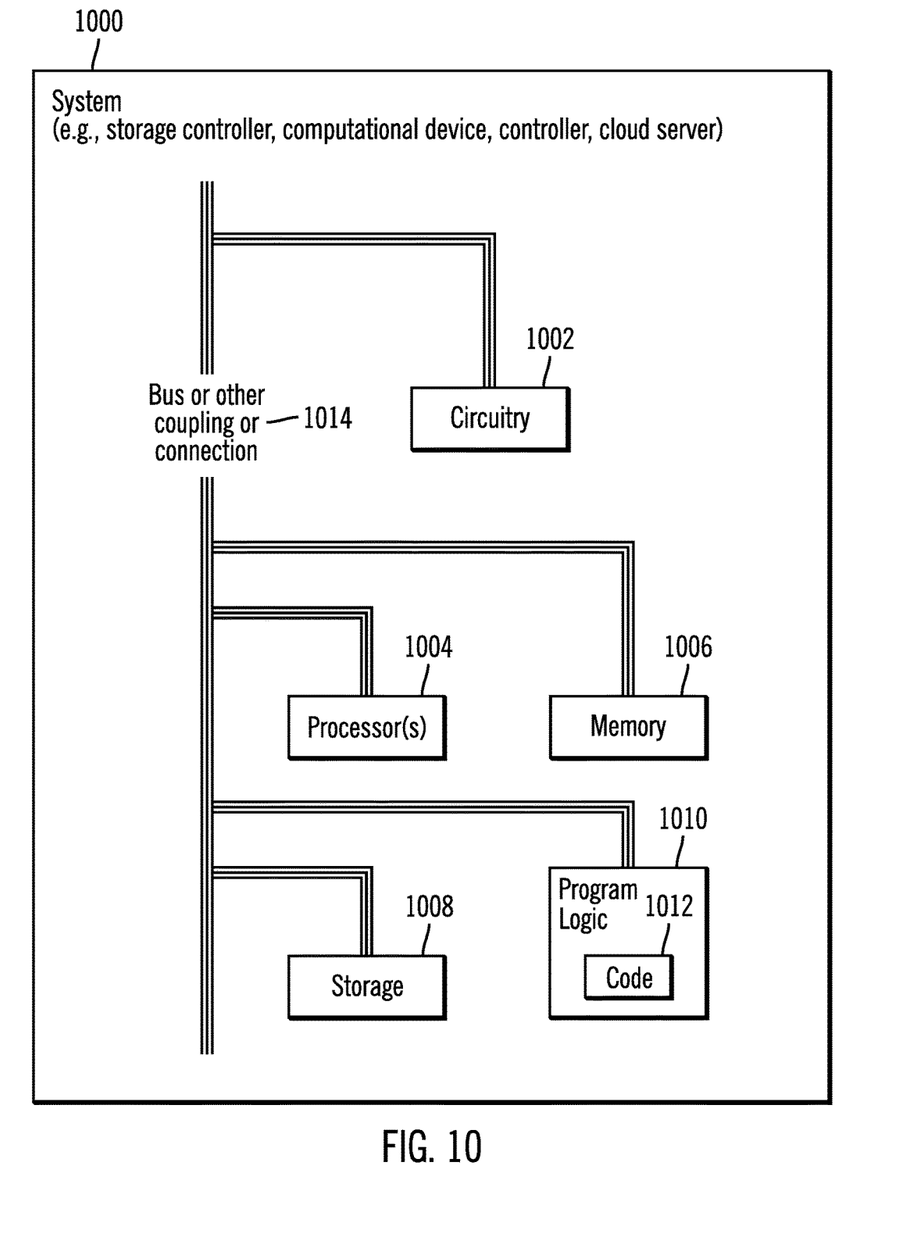
FIG. 10 illustrates a block diagram of a computational system that shows certain elements that may be included in the storage controller including servers shown in FIG. 1, and in cloud servers of storage clouds shown in FIG. 6, in accordance with certain embodiments.

FIG. 10 illustrates a block diagram that shows certain elements that may be included in the storage controller 102, the servers 110, 112, the hosts 106, 108 or other computational devices such as those in storage clouds shown in FIGS. 1-6 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a storage controller comprising a first server and a second server, wherein the first server has affinity to an even numbered logical subsystem (LSS), wherein the second server has affinity to an odd numbered LSS, and wherein each of a plurality logical storage volumes is a member of either the even numbered LSS or the odd numbered LSS;
   storing data of the first server in a first storage cloud that provides memory for the even numbered LSS and non-volatile storage (NVS) for the odd numbered LSS, wherein the first storage cloud is coupled to the first server;
   storing data of the second server in a second storage cloud that provides memory for the odd numbered LSS and provides NVS for the even numbered LSS, wherein the second storage cloud is coupled to the second server;
   in response to both the first server and the second server being operational, performing:
      in response to an operation directed at a logical storage volume that is a member of the even numbered LSS, accessing the even numbered LSS stored in the memory of the first storage cloud; and
      in response to an operation directed at a logical storage volume that is a member of the odd numbered LSS, accessing the odd numbered LSS stored in the memory of the second storage cloud; and
   in response to a failure of the second server, performing by the first server:

in response to an operation directed at a logical storage volume that is a member of the even numbered LSS, accessing the even numbered LSS stored in the memory of the first storage cloud; and in response to an operation directed at a logical storage volume that is a member of the odd numbered LSS, accessing the odd numbered LSS stored in the NVS of the first storage cloud.

2. The method of claim 1 wherein in response to a failure of the first server, performing by the second server:

in response to an operation directed at a logical storage volume that is a member of the odd numbered LSS, accessing the odd numbered LSS stored in the memory of the second storage cloud; and in response to an operation directed at a logical storage volume that is a member of the even numbered LSS, accessing the even numbered LSS stored in the NVS of the second storage cloud.

3. The method of claim 2, wherein the even numbered LSS is identified via an even identifying number, and wherein the odd numbered LSS is identified via an odd identifying number.

4. The method of claim 3, wherein:

the first storage cloud is comprised of two different clouds that together provides memory for the even numbered LSS, and NVS for the odd numbered LSS, to the first server; and the second storage cloud is comprised of two additional different clouds that together provides memory for the odd numbered LSS, and NVS for the even numbered LSS, to the second server.

5. The method of claim 1, the method further comprising:

in response to a failure of the first server, performing operations of the first server by the second server by using data stored in the second storage cloud; and in response to a failure of the second server, performing operations of the second server by the first server by using data stored in the first storage cloud.

6. The method of claim 1, wherein:

the storage controller is coupled to a plurality of hosts that request access to one or more logical storage volumes controlled by the storage controller;

the first server and the second server comprise central electronic complexes enclosed within the storage controller;

the first storage cloud and the second storage cloud are managed by different vendors; and each of the first storage cloud and the second storage cloud comprises a cloud server coupled to a plurality of storage devices.

7. A system, comprising:

a memory; and a processor coupled to the memory, wherein the processor performs operations, the operations comprising:

maintaining a first server and a second server, wherein the first server has affinity to an even numbered logical subsystem (LSS), wherein the second server has affinity to an odd numbered LSS, and wherein each of a plurality logical storage volumes is a member of either the even numbered LSS or the odd numbered LSS;

storing data of the first server in a first storage cloud that provides memory for the even numbered LSS and non-volatile storage (NVS) for the odd numbered LSS, wherein the first storage cloud is coupled to the first server;

storing data of the second server in a second storage cloud that provides memory for the odd numbered LSS and provides NVS for the even numbered LSS, wherein the second storage cloud is coupled to the second server;

in response to both the first server and the second server being operational, performing:

in response to an operation directed at a logical storage volume that is a member of the even numbered LSS, accessing the even numbered LSS stored in the memory of the first storage cloud; and in response to an operation directed at a logical storage volume that is a member of the odd numbered LSS, accessing the odd numbered LSS stored in the memory of the second storage cloud; and in response to a failure of the second server, performing by the first server:

in response to an operation directed at a logical storage volume that is a member of the even numbered LSS, accessing the even numbered LSS stored in the memory of the first storage cloud; and in response to an operation directed at a logical storage volume that is a member of the odd numbered LSS, accessing the odd numbered LSS stored in the NVS of the first storage cloud.

8. The system of claim 7 wherein in response to a failure of the first server, performing by the second server:

in response to an operation directed at a logical storage volume that is a member of the odd numbered LSS, accessing the odd numbered LSS stored in the memory of the second storage cloud; and in response to an operation directed at a logical storage volume that is a member of the even numbered LSS, accessing the even numbered LSS stored in the NVS of the second storage cloud.

9. The system of claim 8, wherein the even numbered LSS is identified via an even identifying number, and wherein the odd numbered LSS is identified via an odd identifying number.

10. The system of claim 9, wherein:

the first storage cloud is comprised of two different clouds that together provides memory for the even numbered LSS, and NVS for the odd numbered LSS, to the first server; and the second storage cloud is comprised of two additional different clouds that together provides memory for the odd numbered LSS, and NVS for the even numbered LSS, to the second server.

11. The system of claim 7, the operations further comprising:

in response to a failure of the first server, performing operations of the first server by the second server by using data stored in the second storage cloud; and in response to a failure of the second server, performing operations of the second server by the first server by using data stored in the first storage cloud.

12. The system of claim 7, wherein:

the system is a storage controller that is coupled to a plurality of hosts that request access to one or more logical storage volumes controlled by the storage controller;

the first server and the second server comprise central electronic complexes enclosed within the storage controller;

the first storage cloud and the second storage cloud are managed by different vendors; and each of the first storage cloud and the second storage cloud comprises a cloud server coupled to a plurality of storage devices.

13. A computer program product, the computer program product comprising a computer readable storage medium having computer readable program code embodied therewith, the computer readable program code configured to perform operations, the operations comprising:
maintaining a storage controller comprising a first server and a second server, wherein the first server has affinity to an even numbered logical subsystem (LSS), wherein the second server has affinity to an odd numbered LSS, and wherein each of a plurality logical storage volumes is a member of either the even numbered LSS or the odd numbered LSS;
storing data of the first server in a first storage cloud that provides memory for the even numbered LSS and non-volatile storage (NVS) for the odd numbered LSS, wherein the first storage cloud is coupled to the first server;
storing data of the second server in a second storage cloud that provides memory for the odd numbered LSS and provides NVS for the even numbered LSS, wherein the second storage cloud is coupled to the second server;
in response to both the first server and the second server being operational, performing:
in response to an operation directed at a logical storage volume that is a member of the even numbered LSS, accessing the even numbered LSS stored in the memory of the first storage cloud; and
in response to an operation directed at a logical storage volume that is a member of the odd numbered LSS, accessing the odd numbered LSS stored in the memory of the second storage cloud; and
in response to a failure of the second server, performing by the first server:
in response to an operation directed at a logical storage volume that is a member of the even numbered LSS, accessing the even numbered LSS stored in the memory of the first storage cloud; and
in response to an operation directed at a logical storage volume that is a member of the odd numbered LSS, accessing the odd numbered LSS stored in the NVS of the first storage cloud.

14. The computer program product of claim 13 wherein in response to a failure of the first server, performing by the second server:

in response to an operation directed at a logical storage volume that is a member of the odd numbered LSS, accessing the odd numbered LSS stored in the memory of the second storage cloud; and
in response to an operation directed at a logical storage volume that is a member of the even numbered LSS, accessing the even numbered LSS stored in the NVS of the second storage cloud.

15. The computer program product of claim 14, wherein the even numbered LSS is identified via an even identifying number, and wherein the odd numbered LSS is identified via an odd identifying number.

16. The computer program product of claim 15, wherein:
the first storage cloud is comprised of two different clouds that together provides memory for the even numbered LSS, and NVS for the odd numbered LSS, to the first server; and
the second storage cloud is comprised of two additional different clouds that together provides memory for the odd numbered LSS, and NVS for the even numbered LSS, to the second server.

17. The computer program product of claim 13, the operations further comprising:
in response to a failure of the first server, performing operations of the first server by the second server by using data stored in the second storage cloud; and
in response to a failure of the second server, performing operations of the second server by the first server by using data stored in the first storage cloud.

18. The computer program product of claim 13, wherein:
the storage controller is coupled to a plurality of hosts that request access to one or more logical storage volumes controlled by the storage controller;
the first server and the second server comprise central electronic complexes enclosed within the storage controller;
the first storage cloud and the second storage cloud are managed by different vendors; and
each of the first storage cloud and the second storage cloud comprises a cloud server coupled to a plurality of storage devices.

* * * * *